US 8,092,402 B2

(12) United States Patent
Iwaki et al.

(10) Patent No.: US 8,092,402 B2
(45) Date of Patent: Jan. 10, 2012

(54) POWER ASSIST CONTROL METHOD, POWER ASSIST CONTROL APPARATUS, AND REDUCTION APPARATUS

(75) Inventors: Junichiro Iwaki, Tokyo (JP); Toji Nakazawa, Tokyo (JP)

(73) Assignee: THK Co., Ltd., Tokyo (JP)

( * ) Notice: Subject to any disclaimer, the term of this patent is extended or adjusted under 35 U.S.C. 154(b) by 1138 days.

(21) Appl. No.: 11/910,211

(22) PCT Filed: Mar. 31, 2006

(86) PCT No.: PCT/JP2006/306910
§ 371 (c)(1),
(2), (4) Date: Sep. 28, 2007

(87) PCT Pub. No.: WO2006/106951
PCT Pub. Date: Oct. 12, 2006

(65) Prior Publication Data
US 2009/0149855 A1 Jun. 11, 2009

(30) Foreign Application Priority Data

Mar. 31, 2005 (JP) ................................ 2005-101885

(51) Int. Cl.
*A61H 1/00* (2006.01)
(52) U.S. Cl. ............................................. 601/5; 601/35
(58) Field of Classification Search ................ 601/5, 23, 601/27, 29, 32–35, 40; 600/595; 602/23, 602/26, 27
See application file for complete search history.

(56) References Cited

U.S. PATENT DOCUMENTS

| 5,208,752 | A | 5/1993 | Kodama et al. |
| 5,428,563 | A * | 6/1995 | Takenaka ...................... 708/845 |
| 6,430,473 | B1 * | 8/2002 | Lee et al. ...................... 700/245 |
| 7,390,309 | B2 * | 6/2008 | Dariush ........................... 601/5 |
| 2004/0158175 | A1 * | 8/2004 | Ikeuchi et al. .................... 601/5 |
| 2007/0185418 | A1 | 8/2007 | Mitsuishi et al. |

FOREIGN PATENT DOCUMENTS

EP 0430285 A1 6/1991
(Continued)

OTHER PUBLICATIONS

Chinese Office Action dated Oct. 31, 2008, issued in corresponding Chinese Patent Application No. 200680011157.8.
European Search Report dated Dec. 16, 2008, issued in corresponding European Patent Application No. 06730858.5.

(Continued)

*Primary Examiner* — Steven Douglas
(74) *Attorney, Agent, or Firm* — Westerman, Hattori, Daniels & Adrian, LLP

(57) ABSTRACT

Power assist control capable of responding to feeling and sensibility when a man applies force to an object is performed. The power assist control outputs an assist force F or a speed F on the basis of an assist target force X detected by a force sensor 114 for detecting force applied to the object. The relationship between the assist target force X and the assist force F or the speed F to be outputted is F∝f(X) on the basis of a function f(X) having the assist target force X as a variable. The function f(X) is assumed to be a non-linear function which is an increasing function and whose derivative f'(X) is a decreasing function. The function f(X) is a (1/n)-th order function or a logarithmic function. Moreover, a function fup(X) when the assist target force X is increased is different from a function fdown(X) when the assist target force X is decreased.

20 Claims, 9 Drawing Sheets

FOREIGN PATENT DOCUMENTS

| | | |
|---|---|---|
| JP | 3-176278 A | 7/1991 |
| JP | 4-100790 A | 4/1992 |
| JP | 09-328961 A | 12/1997 |
| JP | 2003-252600 A | 9/2003 |
| JP | 2004-120875 A | 4/2004 |
| JP | 2004-348699 A | 12/2004 |
| WO | 2004/104719 A1 | 12/2004 |

OTHER PUBLICATIONS

International Search Report of PCT/JP2006/306910, date of mailing Apr. 25, 2006.
Japanese Office Action dated Jun. 14, 2011, issued in corresponding Japanese Patent Application No. 2007-511189.

* cited by examiner

[Fig.1]
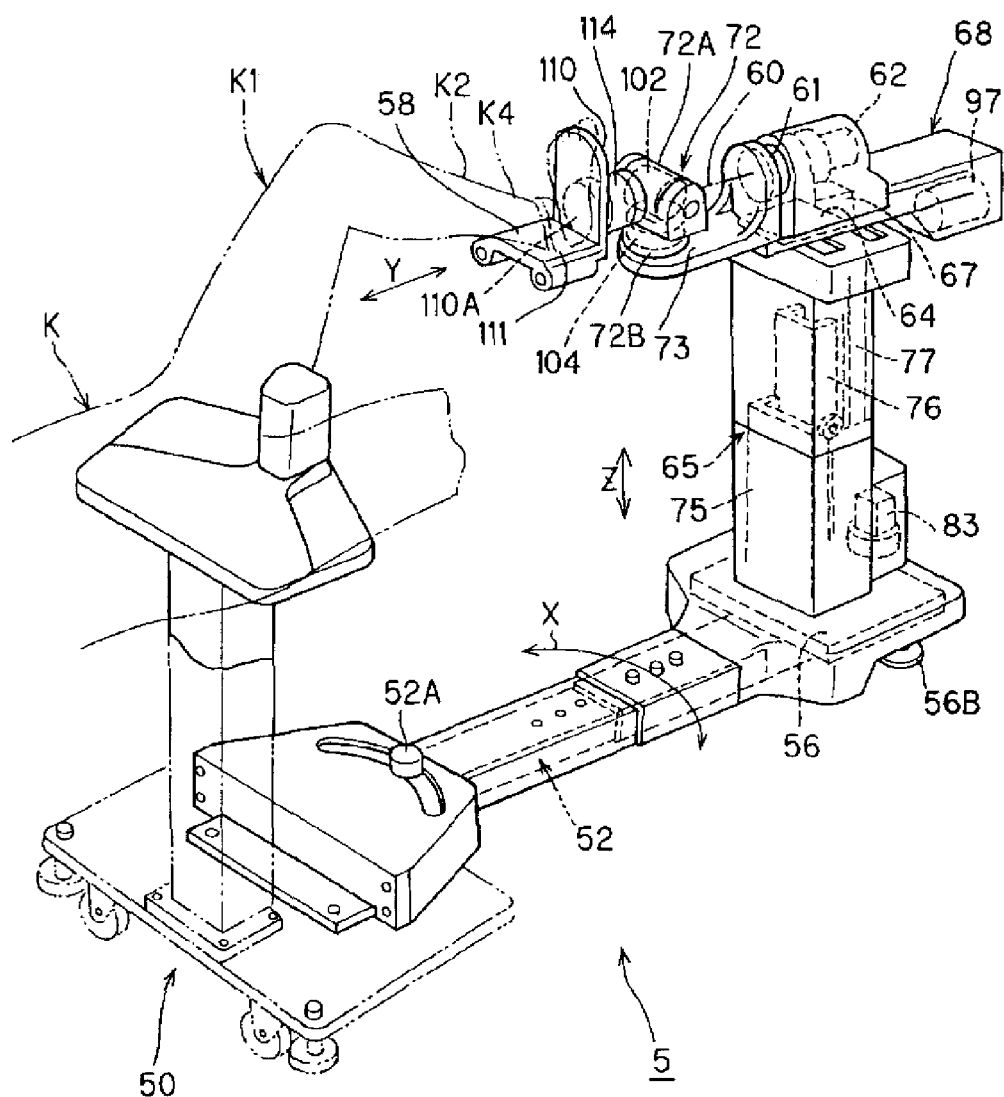

[Fig.2]
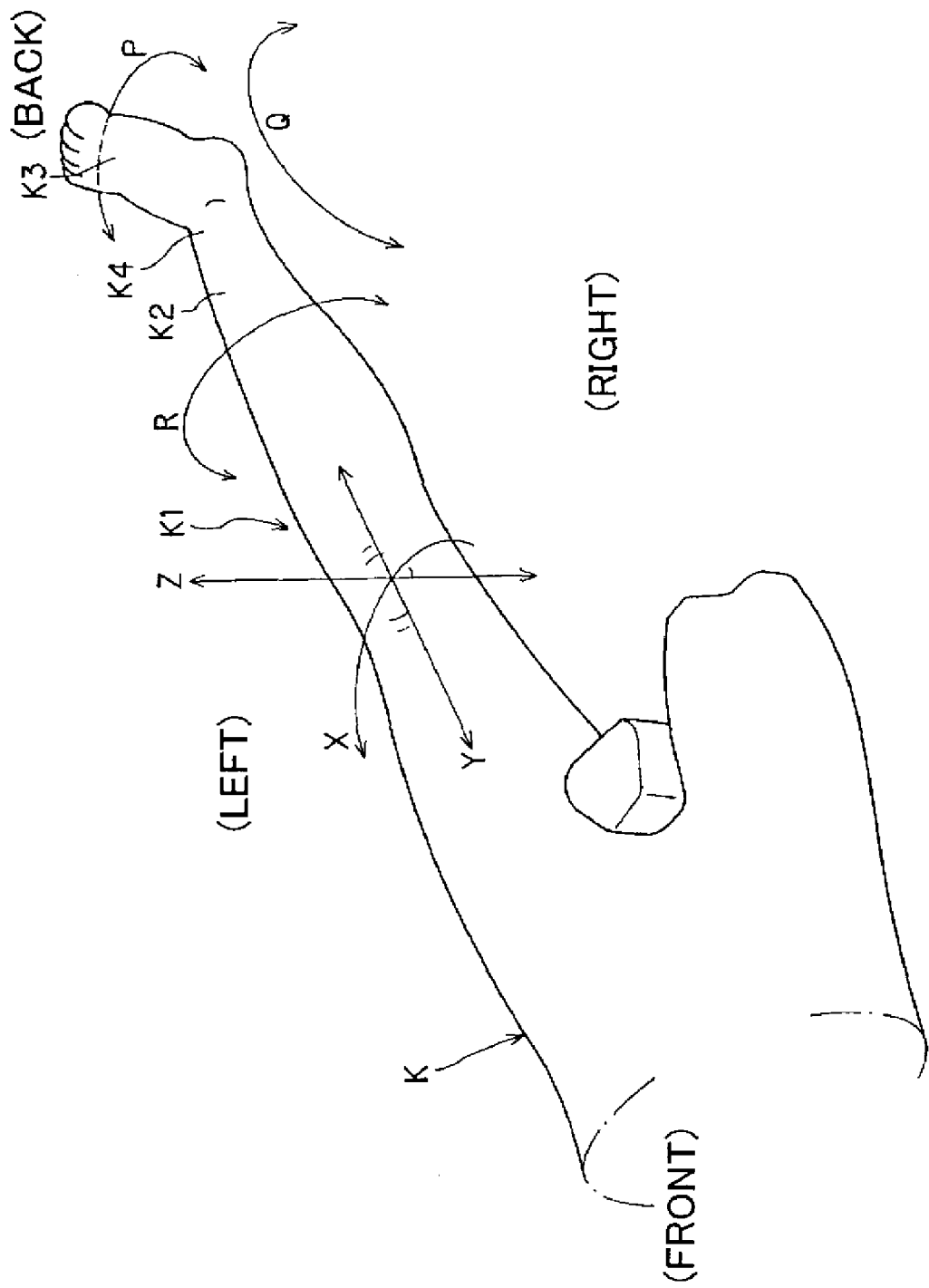

[Fig.3]
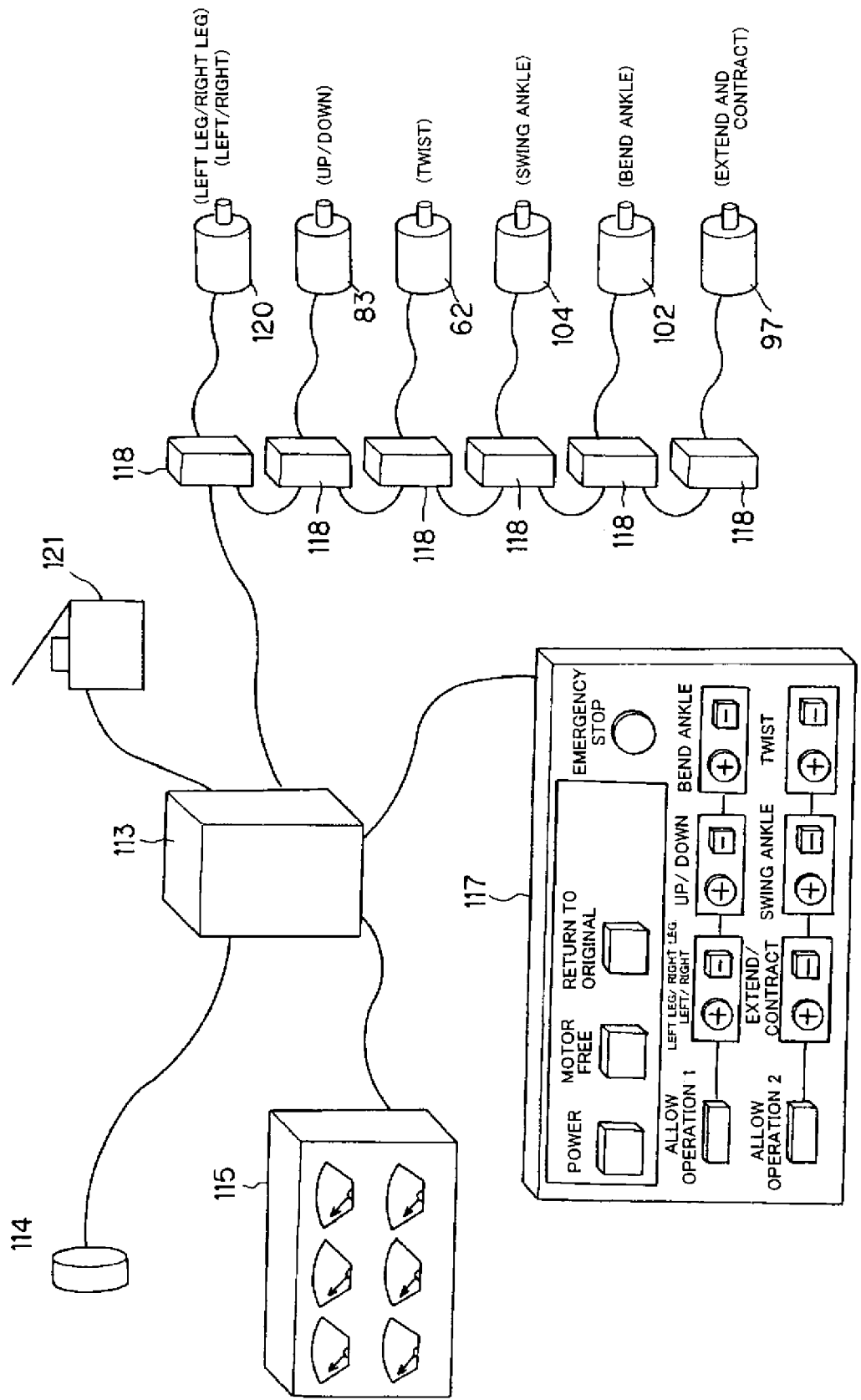

[Fig.4]
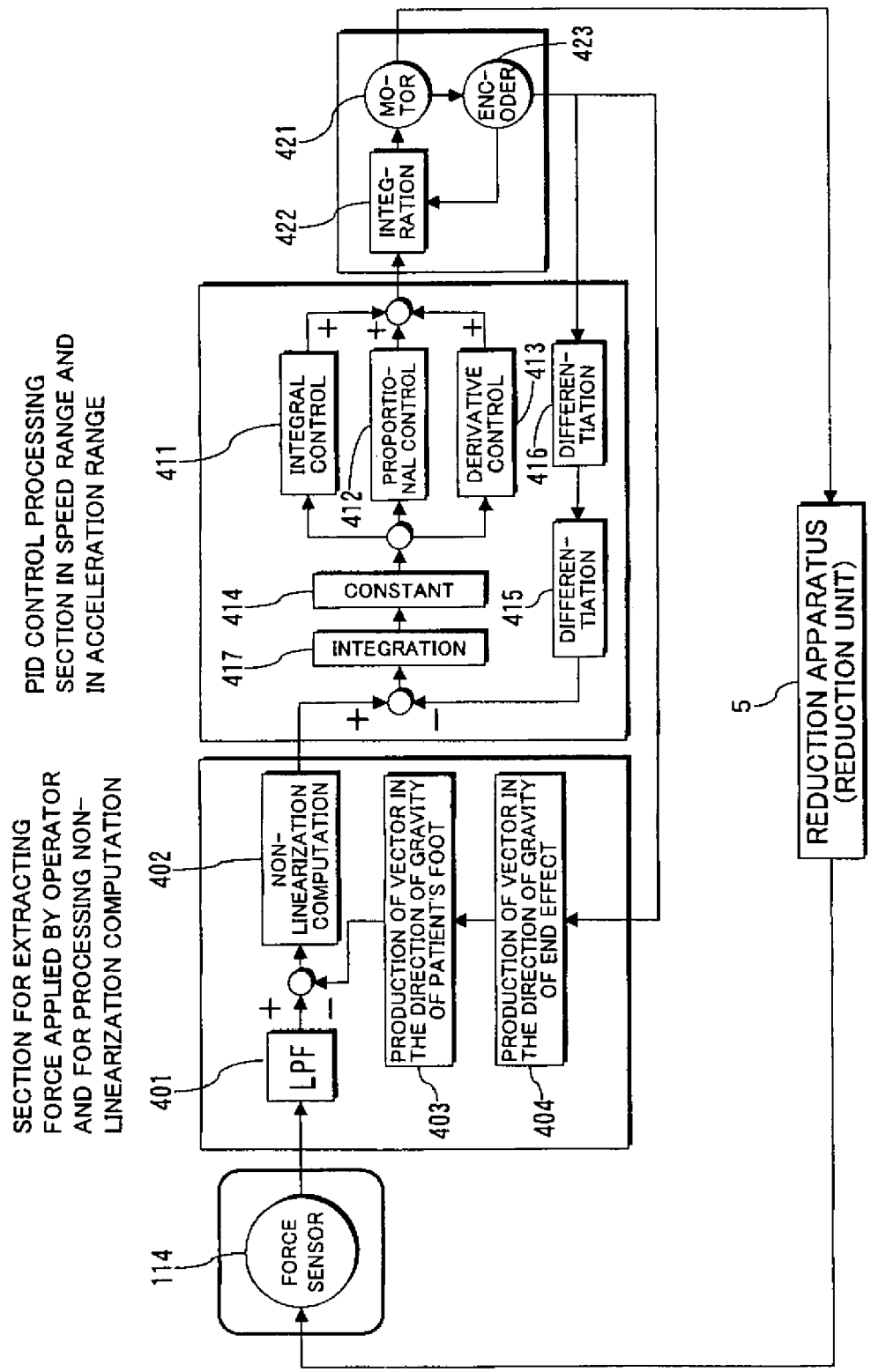

[Fig.5]
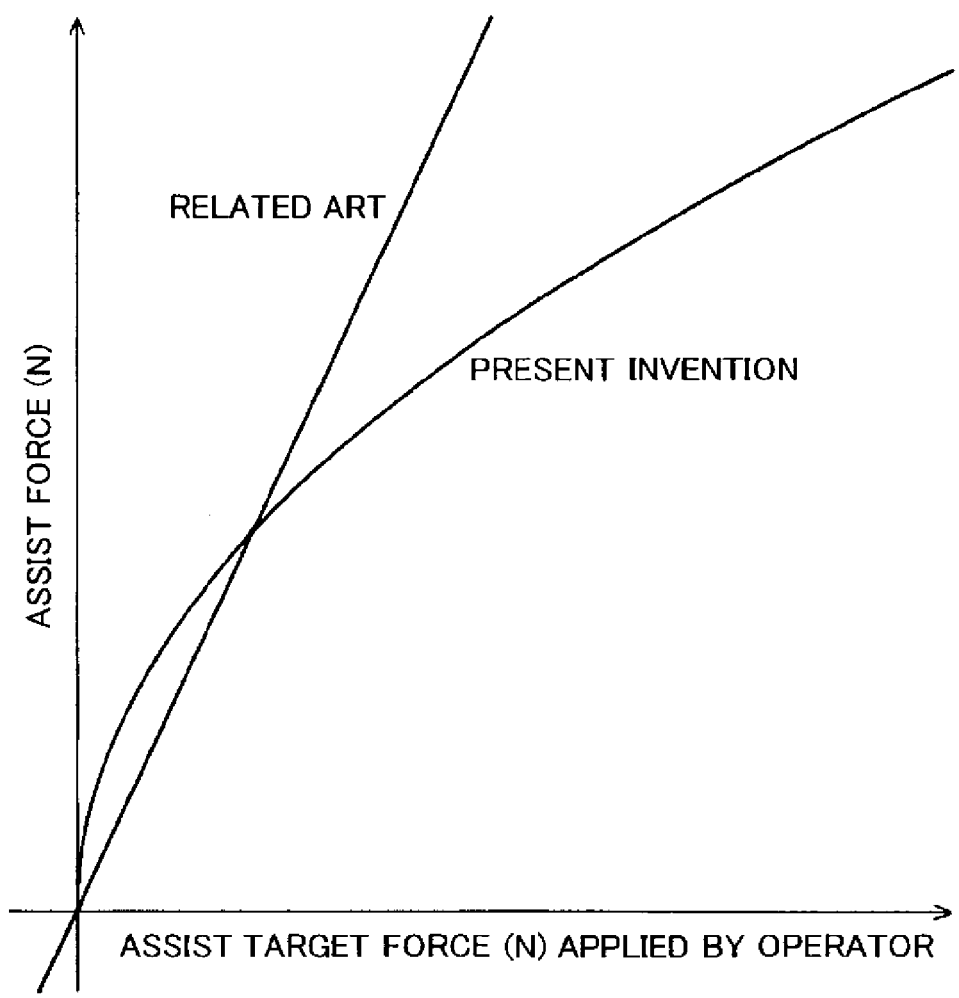

[Fig.6]
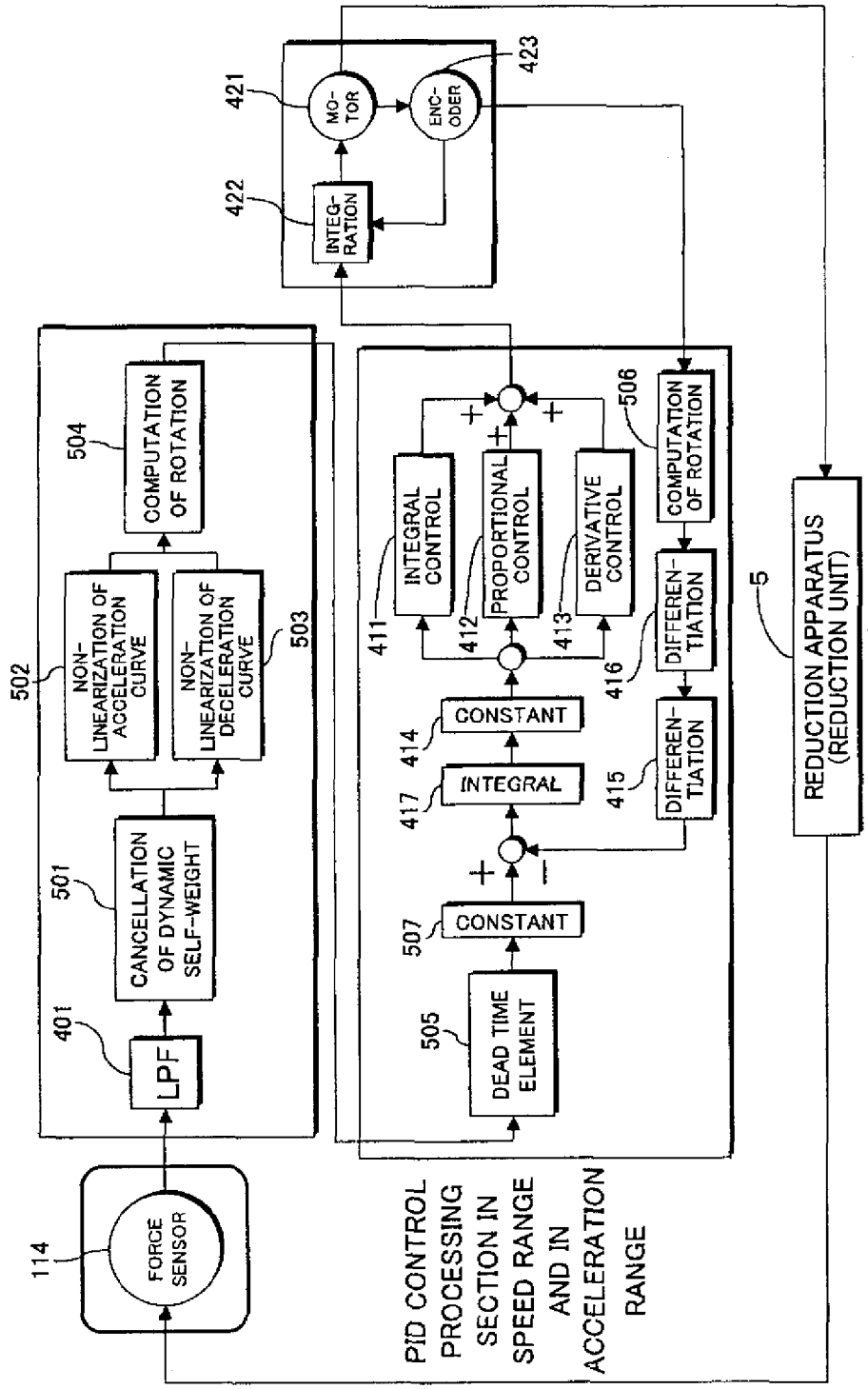

[Fig.7]
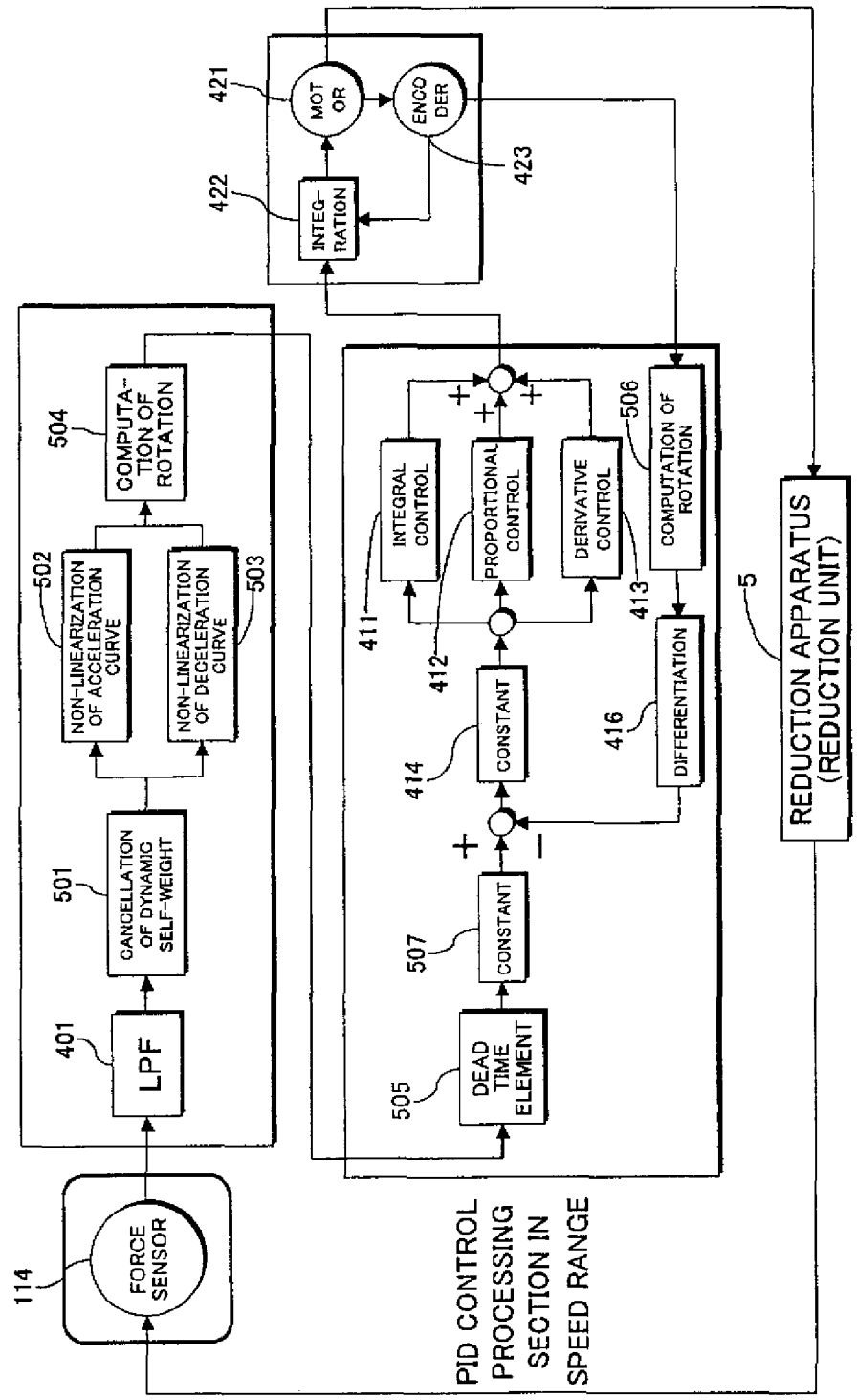

[Fig.8]
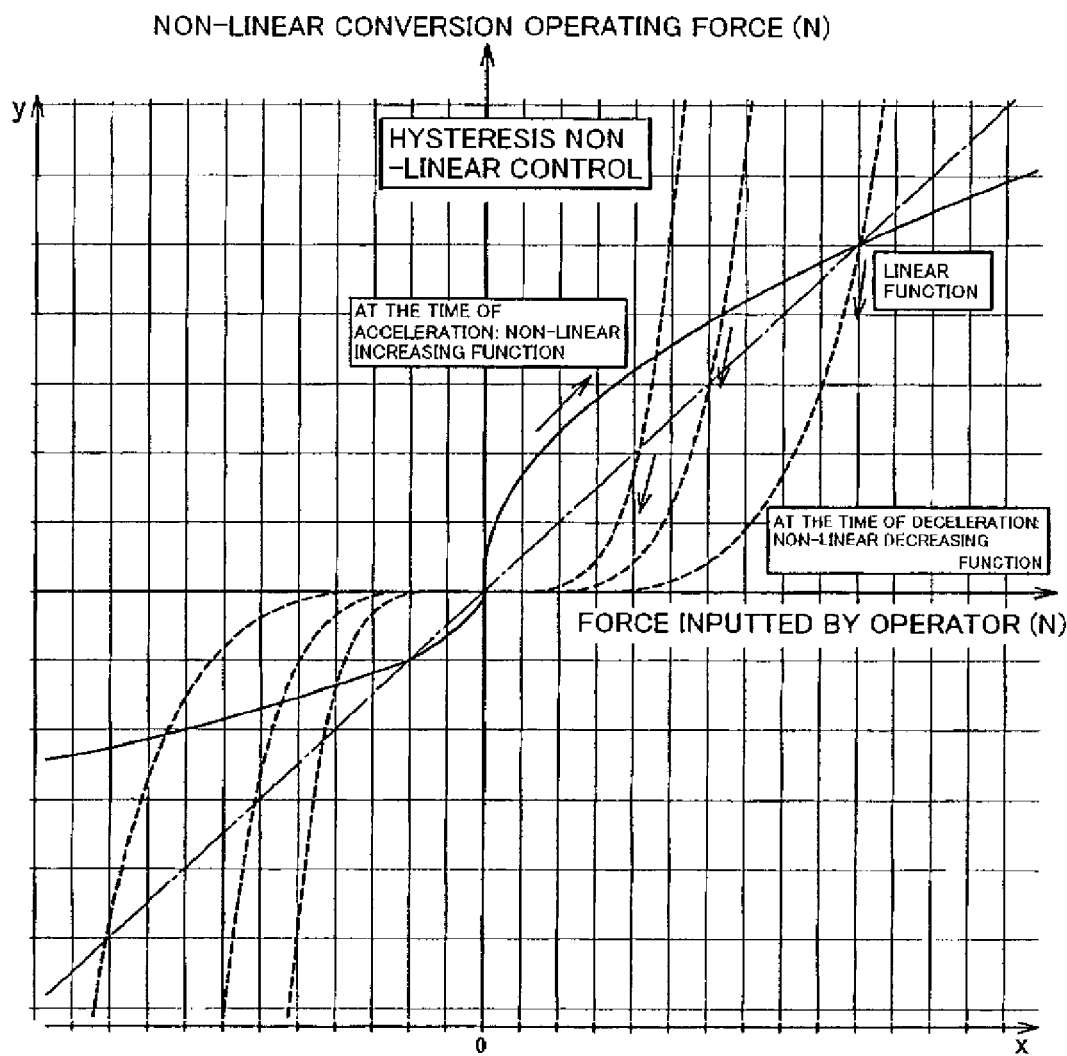

[Fig.9]
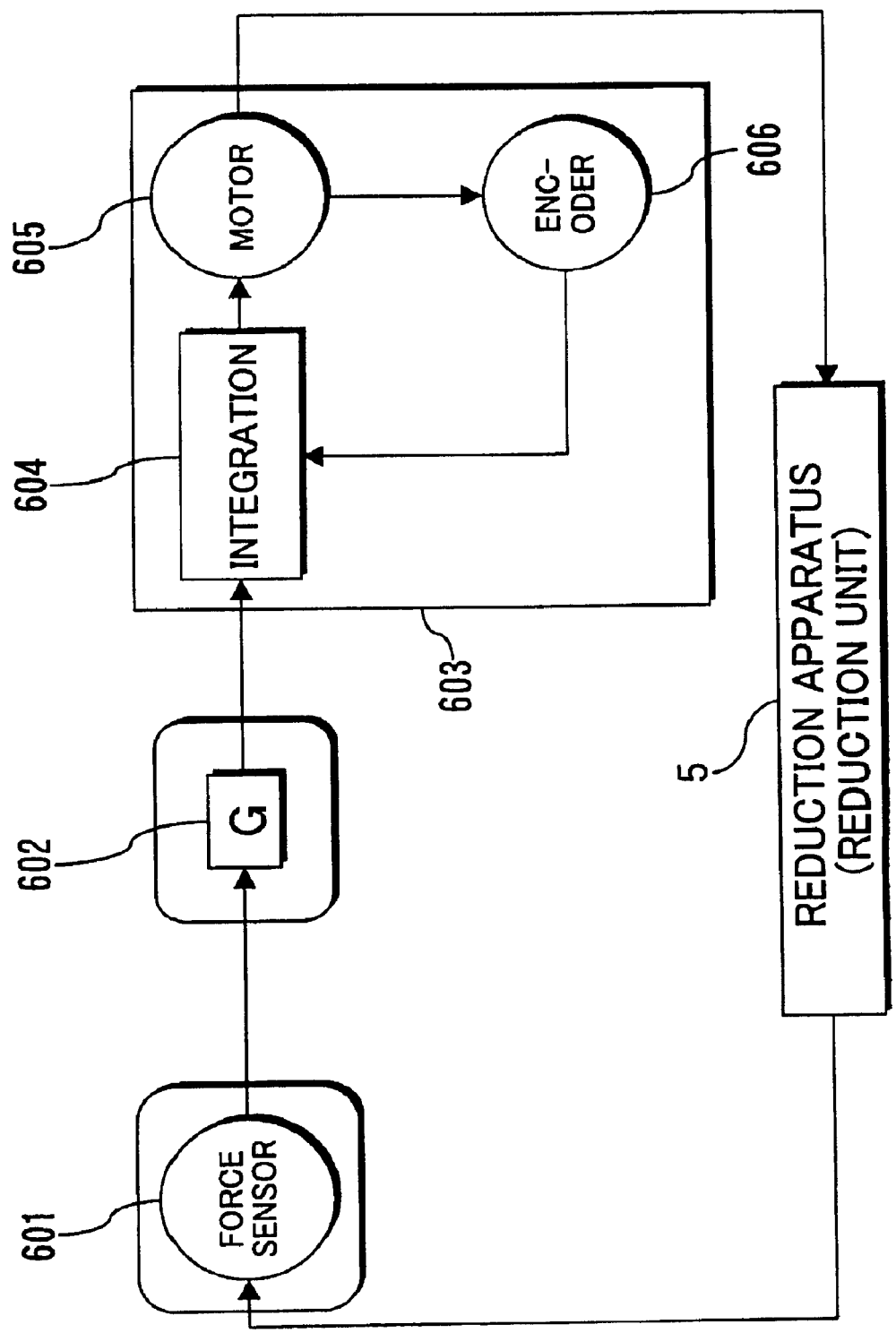

POWER ASSIST CONTROL METHOD, POWER ASSIST CONTROL APPARATUS, AND REDUCTION APPARATUS

TECHNICAL FIELD

The present invention relates to a power assist control method, a power assist control apparatus, and a reduction apparatus, and is suitably applied, in particular, to a reduction apparatus used at the time of performing reduction treatment on a patient's lower limb for a femoral fracture or the like.

BACKGROUND ART

In general, when a man breaks a bone or dislocates a bone, the man undergoes a reduction treatment so as to have the bone treated. In the case of conducting a reduction treatment, a person conducting the reduction treatment such as a doctor or a reduction practitioner makes a patient's leg or the like perform various operations such as extending or contracting, bending, or twisting by the use of his own power. However, to make the patient's leg or the like perform the various actions requires a considerable amount of power, which results in imposing a heavy physical labor on the doctor or the reduction practitioner.

Thus, in order to solve this problem, a reduction apparatus is used. In this reduction apparatus is performed a power assist control for assisting force in a direction in which the force is applied. In other words, in the power assist control in a bone fracture reduction apparatus, when a man applies force, a motor is driven in a direction to assist the force (power).

In the related art, there has been employed a method for assisting force applied by a man, which is obtained by multiplying force by a constant, by a motor, that is, a method for outputting a linear force proportional to force applied by a man (see Patent Document 1)

Patent Document 1: Japanese Patent Application Laid-Open No. 2004-348699
Patent Document 2: Japanese Patent Application Laid-Open No. 2003-252600
Patent Document 3: Japanese Patent No. 3188953

DISCLOSURE OF THE INVENTION

However, in the case of employing this method, a difference is caused between human feeling for force and an assist speed when a reduction apparatus is actually moved, which makes a man feel uncomfortable when the man operates the reduction apparatus. This difference makes it difficult for the man to give a patient a reduction surgery using the reduction apparatus.

Thus, a first object of this invention is to provide a power assist control method capable of performing power assist control corresponding to feeling or sensibility with which a man applies force.

Moreover, a second object of this invention is to provide a power assist control apparatus and a reduction apparatus that perform a power assist control corresponding to feeling with which a man applies force to thereby improve operability.

To achieve the above-mentioned object, a first invention of this invention is a power assist control method for controlling a power assist apparatus by control means in such a way that drive means for applying force to an object outputs an assist force F or a speed F based on an assist target force X applied from outside and measured by force detecting means for measuring force applied to the object, the power assist control method being characterized in that the control means makes the drive means output the assist force F or the speed F by power assist control on the basis of a function f(X) having the assist target force X as a variable, the function f(X) being a function which is an increasing function and whose derivative f'(X) is a decreasing function.

A second invention of this invention is a power assist control apparatus including: force detecting means constructed so as to be able to measure force applied to an object; drive means for applying force to the object; and control means constructed so as to be able to control the drive means and to communicate data with the force detecting means, the power assist control apparatus being characterized in that the control means makes the drive means output an assist force F or a speed F by power assist control on the basis of a function f(X) having an assist target force X measured by the force detecting means as a variable, the function f(X) being a function which is an increasing function and whose derivative f'(X) is a decreasing function.

A third invention of this invention is a reduction apparatus including: force detecting means constructed so as to be able to measure force to be applied to an object; drive means for applying force to the object; and control means constructed so as to be able to control the drive means and to communicate data with force detecting means, the reduction apparatus being characterized in that the control means has a power assist control mechanism constructed in such a way that the drive means can move the object at a speed F or can apply an assist force F to the object on the basis of a function f(X) having an assist target force X detected by the force detecting means as a variable, the function f(X) being a function which is an increasing function and whose derivative f'(X) is a decreasing function.

According to these first, second, and third inventions, when the force applied to the object from outside (assist target force) is small, an increase rate (increase rate of acceleration, acceleration itself, or speed itself) of the assist force F or the speed F driven by the power assist control can be increased, and when the assist target force is small, the assist force F or the speed F driven by the power assist control (that is, an increase rate of acceleration, acceleration itself, or speed itself) can be decreased.

Moreover, in these first to third inventions of this invention, preferably, the predetermined function f(X) is expressed by a Formula 1,

[Formula 1]

$$f(X) = A \cdot (B \cdot X + C)^{\frac{1}{n}} + D$$

where A and B are positive constants, C and D are constants, and n is a natural number not less than 2.

According to this construction, it is possible to improve response performance and to improve the operability of the power assist apparatus. Thus, it is possible to improve response performance in the reduction apparatus and to improve the operability of the reduction apparatus.

A fourth invention of this invention is a power assist control method for controlling a power assist apparatus by control means in such a way that drive means for applying force to an object outputs an assist force F or a speed F based on an assist target force X applied from outside and measured by force detecting means for measuring force applied to the object, the power assist control method being characterized in that the control means makes the drive means output the assist force F or the speed F by power assist control on the basis of a function f(X) having the assist target force X as a variable, a function fup(X) when the assist target force X is increased being different from a function fdown(X) when the assist target force X is decreased.

A fifth invention of this invention is a power assist control apparatus including: force detecting means constructed so as to be able to measure force to be applied to an object; drive means for applying force to the object; and control means constructed so as to be able to control the drive means and to communicate data with the force detecting means, the power assist control apparatus being characterized in that the control means makes the drive means output an assist force F or a speed F by power assist control on the basis of a function f(X) having an assist target force X measured by the force detecting means as a variable, a function fup(X) when the assist target force X is increased being different from a function fdown(X) when the assist target force X is decreased.

A sixth invention of this invention is a reduction apparatus including: force detecting means constructed so as to be able to measure force applied to an object; drive means for applying force to the object; and control means constructed so as to be able to control the drive means and to communicate data with force detecting means, the reduction apparatus being characterized in that the control means has a power assist control mechanism in which the drive means is constructed so as to output an assist force F or a speed F by power assist control on the basis of a function f(X) having an assist target force X measured by the force detecting means as a variable, a function fup(X) when the assist target force X is increased being different from a function fdown(X) when the assist target force X is decreased.

In these fourth, fifth, and sixth inventions, typically, the function fup(X) when the assist target force X is increased and the function fdown(X) when the assist target force X is decreased can be set independently of each other according to the direction of the assist target force X. With this, for example, a difference in the human sensitivity characteristic between a pressing force and a pulling force can be reflected to the power assist control.

Moreover, in these fourth, fifth, and sixth inventions, typically, the function fup(X) when the assist target force X is increased and the function fdown(X) when the assist target force X is decreased can be continuously switched according to an increase and a decrease in the assist target force X.

The function fup(X) is an increasing function, the derivative fup'(X) of the function fup(X) is a decreasing function, the function fdown(X) is an increasing function, and the derivative fdown'(X) of the function fdown(X) is an increasing function. With this, when the assist target force X is increased and when the object is accelerated, and when the assist target force X is decreased and when the object is decelerated, power assist control close to the sensitivity characteristics of force of a human hand can be performed.

Moreover, a bone fracture reduction apparatus and a power assist control apparatus have been presented a problem that when an operator applies force to an object, the rotational speed of the motor of an output shaft does not quickly reach the computation result of the controller, which results in impairing the responsivity of the apparatus. This impairment of responsivity results in applying force more than needed to the patient's foot in a reduction operation, that is, being apt to apply excessive force to thereby impair operability.

Thus, preferably, feedback control by proportional-integral-derivative control (PID control) in the speed range and/or in the acceleration range of the object is performed on the basis of a change in the speed and/or a change in the acceleration of the object.

Moreover, in this invention, the force detecting means is a six axial force sensor capable of detecting force applied in three translational axial directions and in three rotational axial directions, and the power assist control is performed along each axial direction of the six axial directions.

According to the power assist control method, the power assist control apparatus, and the reduction apparatus in accordance with the first to third inventions of this invention, it is possible to perform power assist control close to the feeling of force with which a man applies to an object and hence to improve the operation performance of the apparatus.

Moreover, according to the power assist control method, the power assist control apparatus, and the reduction apparatus in accordance with the fourth to sixth inventions of this invention, it is possible to perform appropriate power assist control according to the magnitude of force with which a man applies to an object and the direction of the force, that is, a pushing force or a pulling force, and hence to improve the operation performance of the apparatus.

BRIEF DESCRIPTION OF THE DRAWINGS

FIG. 1 is a perspective view showing a reduction unit in a reduction apparatus according to a first embodiment of this invention;

FIG. 2 is a diagram showing motions that the reduction unit in the reduction apparatus according to the first embodiment of this invention can make the lower limb of a patient perform;

FIG. 3 is a diagram showing a controller of the reduction apparatus according to the first embodiment of this invention;

FIG. 4 is a control block diagram showing a control system for performing power assist control according to the first embodiment of this invention;

FIG. 5 is a graph showing a conversion operating force with respect to force inputted by an operator in a power assist control apparatus according to the first embodiment of this invention and a related art;

FIG. 6 is a control block diagram showing a control system for performing PID control in a speed range and in an acceleration range that performs power assist control according to a second embodiment of this invention;

FIG. 7 is a control block diagram showing a control system for performing PID control in a speed range that performs power assist control according to the second embodiment of this invention;

FIG. 8 is a graph showing a conversion operating force with respect to force inputted by an operator in a power assist control apparatus according to the second embodiment of this invention and the related art; and FIG. 9 is a control block diagram showing a control system for performing power assist control according to the related art.

BEST MODE FOR CARRYING OUT THE INVENTION

Next, the embodiments of this invention will be described with reference to the drawings. Here, in all drawings of the following embodiments, the same parts or equivalent parts are denoted by the same reference numerals.

First Embodiment

First, a reduction apparatus according to a first embodiment of this invention will be described. In FIG. 1 is shown a reduction unit according to the first embodiment. Here, the reduction apparatus according to this first embodiment is constructed of the reduction unit called a so-called reduction robot and a control device for controlling the reduction unit.

(Reduction Unit)

As shown in FIG. 1, the reduction unit according to this first embodiment is used for giving the lower limb K1 of a patient K a reduction treatment and has a support base 50 for supporting at least the lower body of the patient K whose lower limb K1 is to be reduced. Moreover, In FIG. 2 are shown six axes of the directions in which the reduction apparatus can be moved with respect to the patient K.

As shown in FIG. 1, the support base 50 has a swing arm 52 mounted thereto in such a way as to freely swing in a nearly horizontal plane, the swing arm 52 being formed in a linear shape. The swing arm 52 is driven or swung by the manual operation of a doctor or a reduction practitioner, or an arm drive means (omitted in the drawing but driven by a motor 120 shown in FIG. 3). When the swinging operation of the swing arm 52 is automatically performed by this arm drive means, it is preferable that a positioning bolt 52A is replaced by an electromagnetic chuck (not shown) or the like and that the positioning of the swing arm 52 and the releasing of the positioning are also automatically performed.

The swing arm 52 has a support plate 56 secured to its free end portion. The support plate 56 is mounted with a stopper 56B for stopping and securing the swing arm 52 at an arbitrary position. When the swinging operation of the swing arm 52 is automatically performed by the arm drive means, the stopper 56B is replaced by a member capable of automatically securing the swing arm 52 and releasing the swing arm 52 from being secured. A lower leg support base 58 for supporting the lower leg K2 of the patient K is disposed just above the swing arm 52. The swing arm 52 is used for swinging the lower leg support base 58 in a nearly horizontal plane.

Further, the reduction unit 5 according to this first embodiment includes a first moving table 61 for moving or rotating the lower leg support base 58 in a nearly horizontal axis 60 and a motor 62 as first drive means for rotating and driving this first moving table 61.

Still further, the reduction unit 5 has a third moving table 64 for moving the lower leg support base 58 in a nearly vertical direction, third drive means 65 for driving this third moving table 64, a second third moving table 67 for moving the lower leg support base 58 in a nearly horizontal direction, and second drive means 68 for driving this second moving table 67.

The swing arm 52, the first moving table 61, the second moving table 67, the third moving table 64, and the lower leg support base 58, which have been described above, are stepwise mounted to the support base 50. In this first embodiment, the swing arm 52, the third moving table 64, the second moving table 67, the first moving table 61, and the lower leg support base 58 are mounted stepwise in this order to the support base 50, and the lower leg support base 58 is mounted to the first moving table 61 of a final step. Here, the order of mounting the swing arm 52 and the respective moving tables 61, 67, 64 can be changed as appropriate.

The swing arm 52 is used for moving or swinging the lower limb K1 of the patient K shown in FIG. 1 and FIG. 2 in a left and right direction (in a direction shown by an arrow X) and for positioning the lower leg support base 58 in correspondence to either left leg or right leg of the patient K.

Further, the first moving table 61 is used for twisting the lower limb K1 of the patient K (in the direction shown by an arrow R in FIG. 2). Still further, the second moving table 67 is used for moving, in other words, extending or contracting the lower limb K1 in an anterior-posterior direction (in the direction shown by an arrow Y). Still further, the third moving table 64 is used for moving the lower limb K1 in an up and down direction (in the direction shown by an arrow Z).

Next, the respective constituent elements described above will be described. First, the first moving table 61 and the motor 62 (first drive means) for moving the lower leg support base 58 around the horizontal axis 60, that is, for twisting the lower limb K1 of the patient K (in the direction shown by the arrow R) will be described.

As shown in FIG. 1, the first moving table 61 is formed in a circular disk and is mounted to the output shaft of the motor 62 (which will be described later). The lower leg support base 58 is coupled to this first moving table 61 with a universal coupling 72 and a relay plate 73 interposed in sequence between them. The universal coupling 72 interposed between the lower leg support base 58 and the first moving table 61 is constructed in such a way as to freely rotate around the nearly horizontal axis 60 and to freely rotate around a nearly vertical axis. Moreover, a circular seat is formed on the front end portion of the relay plate 73 and has the bottom end of the universal coupling 72 fitted therein. The rear end of the relay plate 73 is fitted in the first moving table 61.

Next, the construction of the third moving table 64 and the third drive means 65 for moving the lower leg support base 58 in a nearly vertical direction, in other words, for moving the lower limb K1 of the patient K in the up and down direction (in the direction shown by the arrow Z).

As shown in FIG. 1, a guide member 75 is erected on the support plate 56 fixed to the free end portion of the swing arm 52. The third moving table 64 is mounted on this guide member 75 in such a way as to freely move in the vertical direction (in the direction shown by the arrow Z). Specifically, an intermediate member 76 is mounted on the guide member 75 in such a way as to freely move up and down and a lifting and lowering member 77 is mounted on the intermediate member 76 in such a way as to freely move up and down. The third moving table 64 is mounted on the top end of the lifting and lowering member 77.

In this third drive means 65 the intermediate member 76 is moved up and down by the operation of a motor 83. With this, the third moving table 64 is moved up and down to move the lower leg support base 58. The third moving table 64 and the lower leg support base 58 can be swung along a left and right direction (direction shown by an arrow X) with respect to the lifting and lowering member 77.

Next, the second moving table 67 and the second drive means 68 for moving the lower leg support base 58 nearly in the horizontal direction, that is, for moving the lower limb K1 of the patient in the anterior-posterior direction (direction shown by an arrow Y), in other words, for extending and contracting the lower limb K1 of the patient will be described.

This second drive means 68 is constructed of a linear driving device and is provided with an inner block (not shown). Moreover, the second moving table 67 is fastened to the upper surface of the inner block with bolts. In the second drive means 68 constructed in this manner, when a motor 97 is operated, the third moving table 67 fastened to the inner block is moved. Hence, the lower leg support base 58 can be moved along the nearly horizontal direction.

Moreover, a coupling member 72A has a hollow motor 102 built therein, the coupling member 72A being mounted in the universal coupling 72 and constructed in such a way as to freely move or rotate around a nearly horizontal axis, the hollow motor 102 being fourth drive means for rotating the coupling member 72A around its rotational central axis. Moreover, a second coupling member 72B has a hollow motor 104 built therein, the second coupling member 72B constructing the universal coupling 72 with the coupling member 72A and being constructed in such a way as to freely move or rotate around a nearly vertical axis, the hollow motor 104 being fifth drive means for rotating the second coupling member 72B around its rotational central axis.

In this construction, by operating the hollow motor 102, the lower leg support base 58 can be moved in a direction shown by an arrow Q (see FIG. 2), that is, the ankle K4 of the patient can be bent back and forth. Moreover, by operating the other hollow motor 104, the lower leg support base 58 can be moved in a direction shown by an arrow P, whereby the ankle K4 of the patient can be swung to the left and right.

Moreover, as shown in FIG. 1, the lower leg support base 58 is constructed in the shape of a table having an area large enough to support and hold the foot K3 of the patient K and the lower side of the lower leg K2. The lower leg support base 58 is provided with a sole backing member 110 and a band 111, the sole backing member 110 being fixed to the end portion of the lower leg support base 58 so as to have the sole of the patient K put thereon, the band 111 being securing means for securing the lower leg K2 of the patient K. Here, the total weight of the sole backing member 110, the band 111, and the lower leg support base 58 is as small as about 3 Kg.

Moreover, the swing arm 52 is constructed so as to be manually extended and contracted. The swing arm 52 can be extended and contracted not only manually but also automatically. For example, the swing arm 52 can be realized by arm extending/contracting means constructed of a ball screw mechanism and a driving mechanism such as a motor for operating the ball screw mechanism.

(Control Device)

Next, a control device according to this first embodiment for controlling the reduction unit 5 will be described. In FIG. 3 is shown a control device according to the first embodiment of this invention.

As shown in FIG. 3, the control device according to the first embodiment of this invention is provided with a control unit 113 for controlling the whole of a system, a single force sensor 114 constructed so as to be able to detect force applied to the lower limb K1 when the lower limb K1 is variously moved, a force display part 115 for displaying force detected by the force sensor 114, a portable operation box 117, and a foot switch 121 as an on/off switch.

Moreover, a motor 120 included by the arm drive means and the motors 62, 97, 83, 102, and 104 as the first to fifth drive means are connected to the control unit 113 via drivers 118.

Moreover, the control unit 113 is constructed of an information processing part including a CPU (central processing unit) and memories such as a ROM and a RAM and an auxiliary storage part. The control unit 113 constructed in this manner has applications stored therein, the applications being executed on the base of a real-time OS.

Moreover, to secure real-time performance on the basis of the real-time OS in the control unit 113, various tasks such as user tasks and real-time tasks are combined to perform various processings for controlling the reduction unit 5 by a control loop of, for example, 1 kHz. Further, the value of force measured by the force sensor 114 is supplied as data to the control unit 113.

Next, the action of the reduction unit 5 constructed in the above-mentioned manner will be described. As shown in FIG. 1, when reduction treatment is given to the lower limb K1 of the patient K, the lower body of the patient K is placed on the support base 50 in a state where the patient K is on his back and the upper body is supported as suited by a table or the like (not shown). Then, the lower leg K2 and foot K3 of the patient K are placed on the lower leg support base 58 and the lower leg K2 is fixed by the band 111.

Next, the operation box 117 is operated as suited according to the contents of the reduction treatment to drive the swing arm 52, the first to third moving tables 61, 67, 64 or the coupling members 72A, 72B of the universal coupling 72. In other words, when the lower limb K1 is moved in the left and right direction (shown by the arrow X) as shown in FIG. 2, the swing arm 52 is swung in the X direction.

When the lower limb K1 is twisted (in the direction shown by the arrow R), the first moving table 61 is rotated. When the lower limb K1 is moved in the up and down direction (in the direction shown by the arrow Z), the third moving table 64 is moved up and down. When the lower limb K1 is moved in the anterior-posterior direction (in the direction shown by the arrow Y), the second moving table 67 is rotated back and forth.

Further, when the ankle K4 is swung to the left and right (in the direction shown by the arrow P), the second coupling member 72B on the lower side of the universal coupling 72 is rotated and driven in the same direction. Still further, when the ankle K4 is bent back and forth (in the direction shown by the arrow Q), the coupling member 72A on the upper side of the universal coupling 72 is rotated and driven in the same direction.

In the above description, when the remotely-operated operation box 117 is operated by the doctor or the like, the respective motors 120, 83, 62, 104, 102, and 97 are operated, whereby the swing arm 52 and the like are driven and hence the lower limb K1 of the patient K can be moved in a suitable direction.

However, on the other hand, it is necessary for the doctor or the like to move the lower limb K1 by his own force to bring the lower limb K1 into a state suitable for reduction treatment and to make the reduction apparatus recognize the state. In this case, even if the doctor or the like is going to move the lower limb K1 of the patient K, the doctor or the like is prevented by the force held by the driving system including these motors. Thus, the following construction is employed.

That is, the above-mentioned force sensor 114 is constructed so as to be able to detect assist target forces in the respective directions of six axes (respective directions shown by the arrows X, Y, Z, P, and Q), the assist target forces being force applied by the operator of the doctor or the like. The measured value by the force sensor 114 is supplied as numerical data to the control unit 113 as the control means.

The force sensor 114, as shown in FIG. 1, is interposed between a seat portion, which is formed on the coupling member of the universal coupling 72, and a seat portion 110A formed on the back of the sole backing member 110 of the lower leg support base 58.

On the other hand, the operation box 117 shown in FIG. 3 has a switch for switching the control of the reduction apparatus between when the lower limb K1 is moved to a desired state by the actions of the motors and when the lower limb K1 is moved to an optimum state for the reduction treatment by the force of the doctor himself. The control unit 113 can change the control of the reduction apparatus according to the switching of the switch.

(Power Assist Operation)

When the lower limb K1 is moved to a desired state by the actions of the motors, the reduction apparatus is controlled in the manner described above. When the switch is switched in such a way as to move the lower limb K1 to an optimum state for the reduction treatment by the force of the doctor himself, the reduction apparatus is controlled in the following manner.

That is, when the doctor or the like is going to move the lower limb K1 in an arbitrary direction by his hand or the like, force in the direction is applied to the force sensor 114 and the force sensor 114 detects the direction of the force. At this time, the control unit 113 drives a motor corresponding to the direction in a direction to reduce the force applied by the doctor or the like, and when the force detected by the force sensor 114 becomes zero, the control unit 113 stops the motor. The power assist control like this will be specifically described below.

A power assist drive system according to this first embodiment is the following drive system: that is, when force applied to the foot K3 of the patient by the doctor or the like is detected by the force sensor 114, a force or a speed to be outputted is computed by a non-linear computation; PID control corresponding to the information data of the outputted force or speed is performed and feedback control is performed, whereby the reduction apparatus is moved to an arbitrary position or posture.

Thus, in this first embodiment, a difference between a detection reference detected at the time of starting the power assist control and the measured value of the force sensor 114, that is, an assist target force is extracted by the one force sensor 114 mounted in the reduction apparatus.

That is, first, to start a power assist operation, the foot switch 121 shown in FIG. 3 is depressed by the doctor or the like. At this time, by the control unit 113, the value of the force sensor 114 at a point in time of instant when the foot switch 121 is depressed is set as the origin of the assist target force or a detection reference, and a change in the value is measured after the point in time. In other words, at the instant when the foot switch 121 is depressed first, a gravity canceling processing is performed.

With this, the assist target force can be detected and the measured value of the force sensor 114 is brought to 0 (N), the real origin of the force sensor 114 is stored in the control unit 113. Then, force is applied to the foot K3 by the doctor or the like by using man power within a range necessary for the reduction treatment. When the man power by the doctor or the like is applied, the measured value by the force sensor 114 is greatly changed.

At this point in time, the magnitude of the man power applied by the doctor or the like, that is, "the force applied to the foot K3" is set as an assist target force. Then, to apply a drive force responsive to this assist target force to the foot K3, a signal is supplied to the driver 118 by the control unit 113, whereby necessary motors among the motors 62, 83, 97, 102, 104, and 120 are driven in a direction to reduce a difference between the detection reference and "the force applied to the foot K3". With this, a desired drive force is applied to the foot K3.

Further, as described above, the control unit 113 stores also the real origin of the force sensor 114. For this reason, a "force being applied to the foot K3" can be detected from the real origin, the measured value of the force sensor 114, and the magnitude of "the force applied to the foot K3" set in the above-mentioned manner. In other words, "the force being applied to the foot K3" and "the force applied to the foot K3" can be detected by the one force sensor 114 for measuring force. Then, in the state where the doctor or the like applies the force to the foot K3, an assist force is applied to the foot K3 by the motors necessary for the power assist control among the motors 62, 83, 97, 102, 104, and 120 of the driving system.

Subsequently, when "the force being applied to the foot K3" is increased in the state where the force is applied to the foot K3 by the doctor or the like, the measured value of the force sensor 114 is increased. Here, the gradient of the measured value of the force sensor 114 at this time can be changed in response to the state of the reduction treatment and the settings by the doctor or the like, and if a speed at which the force is applied is set at a desired speed, a necessary speed can be obtained. The difference between the detection reference and the measured value by the force sensor 114, that is, the assist target force is decreased as the whole in response to an increase in the measured value of the force sensor 114. A drive force applied to the foot K3 is also decreased with a decrease in the assist target force. When the target assist force continues decreasing and hence the drive force to be applied to the foot K3 decreases, the measured value of the force sensor 114 becomes close to the detection reference. In response to this, the drive force applied to the foot K3 becomes close to zero and then goes in a direction to stop.

Moreover, when the quantity of increase of the "force being applied to the foot K3" balances with the "force applied to the foot K3", in other words, when the measured value of the force sensor 114 reaches the assist origin (detection reference), the assist target force becomes 0 (N) and hence the drive force applied to the foot K3 becomes 0 and hence the assist operation stops. In this regard, even after the assist operation stops, if the foot switch 121 is again pressed down, the above-mentioned assist operation can be continuously performed.

Moreover, in this first embodiment is employed a mode in which the doctor or the like separates his foot from the foot switch 121 to release the drive force to thereby stop the assist operation. In other words, when the operator of the doctor or the like feels abnormal, the operator can immediately stop driving the reduction apparatus.

(Power Assist Control)

Next, the above-mentioned power assist control according to this first embodiment will be described in detail. In FIG. 4 is shown a control system for performing this power assist control and in FIG. 5 is shown a graph of a relationship of the assist force to the input of the assist target force by the operator of the doctor or the like of the power assist control according to this first embodiment. Moreover, in FIG. 9 is shown a control system for performing a power assist control according to a related art described in the Patent Document 1. Here, while an example in which an assist force is outputted will be described in the following description, a speed may be outputted. In many cases, a signal for determining a speed is supplied as an instruction signal to the motor or the like, so an assist force to be described below may be a speed to be outputted for assist.

The control performed in the following description is performed by an information processing part in the above-mentioned control device on the basis of the control program. Various portions are driven on the basis of the control signal from the information processing part and the signals from various parts of the reduction apparatus. In the following description, for the purpose of facilitating the understanding of this control, the respective processings will be described.

First, in the power assist control according to the related art shown in FIG. 9, as shown by a straight line graph in FIG. 5 (graph of "related art" in FIG. 5), the power assist control is performed in such a way that an assist force (C·X) obtained by multiplying an assist target force X applied to an object by a constant C is further applied to the foot of the patient (patient's foot) in the reduction unit 5, the assist force X being force that a man applies to the sole backing member 110 and the band 111 of the reduction unit 5 at the time of reducing a broken bone, or in such a way that a speed at which the assist target force X is applied becomes a speed proportional to the assist target force X applied to the sole backing member 110 and the band 111.

However, the power assist control like this presents a problem that the operator will inevitably feel uncomfortable. In other words, when the operator of the reduction apparatus applies force to the patient's foot, even if the operator applies the force at a first step, the operator needs to apply the force until an assist force is produced and hence in the sense of feeling the operator feels the reduction apparatus gradually starting to move, which results in reducing the operability of the reduction apparatus.

Thus, the present inventor has conducted an earnest study of the reduction apparatus so as to improve the operability of the reduction apparatus in consideration of this human feeling. The outline of the study will be described below.

That is, according to the findings of the inventor, a living thing amplifies an input from a sensory organ non-linearly, that is, in a non-straight line manner. For example, the visual sense of human sensory organs has an extremely wide dynamic range from starlight in the night to sunlight in the daytime. Hence, the inventor has conducted a study and has come to find that the spinal marrow and brain of a living thing, in particular, of a man has a characteristic that sensitivity is amplified in a lower range and is reduced in a higher range.

Thus, the inventor has conducted various studies on the basis of findings obtained in this manner and has found that in the case of performing power assist control on the basis of a predetermined function, a function in which sensitivity is amplified in a lower range and is reduced in a higher range is preferable. Examples of a function like this f(X) are a logarithmic function (f(X)=ln(X), f(X)=log$_a$(X)) and a (1/n)-th order function (where n is a natural number not less than 2).

Thus, the inventor has further invented power assist control suitable for human feeling and sensibility on the basis of these studies. As a result, the inventor has found that it is desired to control an assist force in such a way that when the input of assist target force (force to be applied to an object) applied by an operator such as a practitioner and detected by the force sensor 114 as force detecting means is small, a speed is increased at a high acceleration and that when the input of assist target force is large, the speed is increased at a low acceleration.

In other words, when the assist target force X applied to the patient's foot of an object by a man is small, an increase rate of a force Y (or speed) driven by the power assist control is increased on the basis of a "predetermined function f(X)", and when the assist target force X is large, the increase rate of the force Y (or speed) driven by the power assist control is decreased on the basis of the predetermined function f(X). The predetermined function f(X) satisfying such condition, as shown by a curved graph in FIG. 5, is "a function which is an increasing function and whose derivative f'(X) differentiated by the assist target force X is a decreasing function", more preferably, "a function which is a monotone increasing function and whose derivative f'(X) differentiated by the assist target force X is a monotone decreasing function". Here, in FIG. 5, the function f(X) passes through the origin but does not necessarily pass through the origin when there is provided an offset.

Thus, in this first embodiment, as shown in FIG. 4, first, signal noises are removed from the data of the assist target force inputted from the force sensor 114 by a low-pass filter 401 (LPF 401). The data of the assist target force is inputted to a non-linearization computation processing part 402. Then, this data of the assist target force is subjected to non-linearization computation processing. Moreover, data supplied from an encoder 423 is subjected to a gravity canceling processing for removing the effect of the gravity by an end effect gravity direction vector production processing part 404 and a patient's foot gravity direction vector production processing part 403.

Examples of a function used in the non-linearization computation processing part 402 are a logarithmic function and a (1/n)-th order function. Specifically, assuming that: A, B are constants; C is a target force offset (input); D is an assist force offset (output); and n is a natural number not less than 2, the following equation can be employed.

[Formula 2]

$$f(X) = A \cdot (B \cdot X + C)^{\frac{1}{n}} + D = A \cdot \sqrt[n]{B \cdot X + C} + D \qquad (1)$$

Here, a curved graph in FIG. 5 shows a function of the Formula (1) in which n=2 and which passes through the origin, that is, a graph of the following function.

[Formula 3]

$$f(X) = A \cdot (B \cdot X)^{\frac{1}{2}} = A \cdot \sqrt{B \cdot X} \qquad (2)$$

Moreover, assuming that: A and B are constants; C is a target force offset (input); and D is an assist force offset (output), the following equation can be employed as a logarithmic function.

[Formula 4]

$$f(X)=A \cdot \ln(B \cdot X+1+C)+D \qquad (3)$$

Moreover, as a result of earnest experiments conducted by the present inventor, the inventor has come to find that the equation (2) is preferable. In this regard, various functions other than the (1/n)-th order function and the logarithmic function can be utilized for usage other than the reduction apparatus. For example, part of a trigonometric function (part which increases monotonously and the derivative of which decreases monotonously) can be also used.

(PID Control)

Moreover, as shown in FIG. 9, in the related art described in the Patent Document 1, the power assist control is performed by performing a computation processing 602 for multiplying the measured value measured by the force sensor 601 by a coefficient G and then by performing open-loop control using integration processing part 604, a motor 605, and an encoder 606. In this case, according to the findings obtained from the earnest experiment conducted by the present inventor, the inventor has found that "the rotational speed of an output shaft motor does not converse quickly in response to a force command provided by a user", which presents a problem.

Thus, in this first embodiment, as shown in FIG. 4, in addition to an operation control section for performing an extraction processing of force applied by the operator of the reduction apparatus and a non-linearization computation processing, there is provided a proportional-integral-derivative control (PID control) processing section in a speed range and in an acceleration range. Hereinafter, the PID control by feedback control employed by the reduction apparatus according to this first embodiment will be described.

Proportional control (P control) is control for adjusting the amount of operation in proportion to the magnitude of deviation. Moreover, integral control (I control) is control for adjusting the amount of operation in proportion to the integration of deviation. This I control can remove a steady-state deviation remaining with respect to a target value or turbulence when a control object having a self-averaging property is subjected to only proportional control. Moreover, derivative control (D control) is control for adjusting the amount of operation in proportion to the derivative of deviation. This D control reflects trend in an increase/decrease in deviation to the determination of the amount of operation to improve control characteristic.

In this first embodiment, position data, speed data, rotational angle data outputted from the encoder 423 are subjected twice to differential processing in differential processing parts 415, 416 and are supplied as information in an acceleration range to the PID control section. Position information, which is outputted from the encoder 423 and subjected twice to the differential processing to be changed into information in an acceleration range, is subtracted from assist force information and/or speed information and/or acceleration information outputted from the non-linearization computation processing part 402 and resultant information is supplied to PID control section. In the PID control section, this information is subjected to a constant multiplication processing 414 and then is supplied to a proportional control part 412, an integral control part 411, and a derivative control part 413 and is subjected to respective controls and then resultant information is summed and then outputted.

This output is supplied to an integral processing part 422 and is subjected once to an integration processing and then is supplied as information in a speed range or displacement information to a motor 421. In the motor 421, driving is controlled on the basis of this information and driving of respective motors in the reduction unit 5 of the reduction apparatus. Here, the driving information of the motor 421 is supplied also to the encoder 423.

In this manner, in the PID control according to this first embodiment, not only the PID control in the speed range but also the PID control in the acceleration range is performed. With this, it is possible to shorten the time required for convergence of a target speed or displacement.

In other words, by subjecting the assist force to the PID control in the speed range and in the acceleration range, it is possible to make the output shaft speed (rotational speed of the motor of the output shaft) to converge to a predetermined speed or displacement to make behavior stable and hence to prevent vibrations when the output shaft speed converges to the predetermined speed or displacement.

Second Embodiment

Next, a power assist control method and its control device according to a second embodiment of this invention will be described. Here, the reduction apparatus is the same as in the first embodiment and hence its description will not be described.
(Power Assist Operation)

In this second embodiment, when the doctor or the practitioner (operator) is going to move the lower limb K1 to a desired state by the action of the motors, the reduction unit is controlled in the manner described in the first embodiment. On the other hand, when the control mode is changed to a mode in which the doctor or the practitioner is going to move the lower limb K1 to an optimum state by his own force, the reduction unit is controlled in the following manner.

That is, when the doctor or the like is going to move the lower limb K1 in an arbitrary direction by using the hand or the like, force in the direction is applied to the force sensor 114. With this, the force sensor 114 detects the direction of the force. At this time, the control unit 113 drives a motor responding to the direction in a direction to reduce the force applied by the operator, that is, in a direction in which the operator applies the force. At this time, there are a case where the force applied by the operator is increased and a case where the force applied by the operator is decreased. When the force detected by the force sensor 114 is brought to zero, the motor is stopped. This power assist control operation will be specifically described below.

The power assist drive system according to this second embodiment is fundamentally the same as in the first embodiment. That is, when the force applied to the foot K3 of the patient by the operator such as the doctor is detected by the force sensor 114, first, a force or speed to be outputted is computed by non-linearization computation. Then, the information data of this outputted force or speed is subjected to the PID control and the feedback processing is performed, whereby the power assist control desired by the operator is performed.

In this second embodiment, the difference between the detection reference detected at the time of starting the power assist control and the measured value of the force sensor 114, that is, the assist target force is extracted by one force sensor 114 mounted on the reduction apparatus.

That is, first, to start the power assist operation, the foot switch 121 shown in FIG. 3 is depressed by the operator. At this time, the value of the force sensor 114 at the instant when the foot switch 121 is depressed is set as the origin of the assist target force, that is, a so-called detection reference by the control unit 113. In addition to the setting of the detection reference, a change in the value of the force sensor 114 is measured thereafter by the control unit 113 with reference to the origin of the assist target force. In other words, at the instant when the foot switch 121 is depressed, a dynamic gravity cancel processing is performed.

With this, the assist target force can be detected and the measured value of the force sensor 114 is brought to 0 (N). In this regard, the state where the force sensor 114 has no force applied thereto, that is, the real origin of the force sensor 114 is stored in the control part (not shown) of the control unit 113.

Force is manually applied to the foot K3 within a range necessary for reduction treatment by the doctor or the like. When the force of the operator such as the doctor is applied, the measured value by the force sensor 114 is greatly changed.

At this timing, the magnitude of the man power of this operator, that is, "force applied to the foot K3" is set as an assist target force. Then, to apply a drive force responsive to this assist target force to the foot K3 by the control unit 113, a signal is supplied to the drivers 118 and the necessary motors among the motors 62, 83, 97, 102, 104, and 120 are driven in a direction to reduce the difference between the detection reference and the "force applied to the foot K3". With this, a predetermined drive force is applied to the foot K3.

Moreover, as described above, the control unit 113 stores also the real origin of the force sensor 114. For this reason, "a force being applied to the foot K3" can be detected from this real origin, the measured value by the force sensor 114, and the magnitude of the "force applied to the foot K3" set in the manner described above. In other words, the "force being applied to the foot K3" and the "force applied to the foot K3" can be detected by the one force sensor 114 for measuring force. An assist force is applied to the foot K3 by motors necessary for driving the power assist control among the motors 62, 83, 97, 102, 104, and 120 of the driving system in the state where the doctor or the like applies the force to the foot K3.

Subsequently, when the "force being applied to the foot K3" is increased in the state where the doctor or the like applies the force to the foot K3, the measured value by the force sensor 114 is increased. Here, the gradient of the value measured at this time by the force sensor 114 can be varied according to the state of the reduction treatment and the settings by the doctor or the like, and a necessary speed can be obtained by bringing a speed at which the force is applied to a desired speed. The difference between the detection reference and the measured value by the force sensor 114, that is, the assist target force is decreased as the whole according to an increase in the measured value of the force sensor 114. A drive force applied to the foot K3 is also decreased with this decrease in the assist target force. Subsequently, when the assist target force continues being decreased and the hence the drive force applied to the foot K3 is decreased, the measured value by the force sensor 114 is brought close to the detection reference. With this, the drive force applied to the foot K3 is brought close to 0, whereby the power assist operation is headed in a direction to stop.

Moreover, when the amount of increase in the "force being applied to the foot K3" balances with the "force applied to the foot K3", that is, the measured value of the force sensor 114 reaches an assist origin (detection reference), the assist target force is brought to 0(N) and hence the drive force applied to the foot K3 is brought to 0, that is, the assist operation is stopped. Here, even after the assist operation is stopped, when the foot switch 121 is again depressed, the assist operation can be again continued.

Moreover, as is the case with the first embodiment, this second embodiment is also constructed in such a way that the operator of the doctor or the like separates the foot from the foot switch 121 to release the drive force to stop the assist operation, if necessary. With this, when the operator of the doctor or the like feels abnormal, the operator can stop driving the reduction unit immediately.

(Power Assist Control Method)

Next, a control method in the power assist control according to this second embodiment operated in the above-mentioned manner will be described. In FIG. 6 is shown a speed/acceleration control system for performing this power assist control, and in FIG. 7 is shown a speed control system for performing this power assist control. Moreover, in FIG. 8 is shown a control example of the output of an assist force as a one-dimensional vector to the input of the assist target force as a one-dimensional vector, the input being applied by the operator of the power assist control according to this second embodiment. Here, the control system of power assist control according to the related art is shown in FIG. 9.

Moreover, while an example in which an assist force is outputted as a vector will be described in the following description, an output is not necessarily limited to force (or acceleration) but the output may be a speed of a vector. Further, since a signal to determine a speed is supplied as an instruction signal to the motor or the like in many cases, an assist force to be described below may be a speed outputted for assist. Still further, control performed in the following description is performed by an information processing part in the above-mentioned control device on the basis of the control program. Various portions are driven on the basis of a control signal from this information processing part and signals from the respective parts of the reduction apparatus. For the purpose of facilitating the understanding of this control, the respective processings will be described in the following description.

First, in the power assist control according to the related art shown in FIG. 9, as shown by a straight line graph in FIG. 5 (graph of "related art" in FIG. 5), the power assist control is performed in such a way that an assist force (C·X) obtained by multiplying an assist target force X applied to an object by a constant C is further applied to the foot of the patient (patient's foot) in the reduction unit 5, the assist force X being force that a man applies to the sole backing member 110 and the band 111 of the reduction unit 5 at the time of reducing a broken bone, or in such a way that a speed at which the assist target force X is applied becomes a speed proportional to the assist target force X applied to the sole backing member 110 and the band 111.

However, the power assist control like this presents a problem that the operator will inevitably feel uncomfortable. In other words, when the operator of the reduction apparatus applies force to the patient's foot, even if the operator applies the force at a first step, the operator needs to apply the force until an assist force is produced and hence in the sense of feeling the operator feels the reduction apparatus gradually starting to move, which results in reducing the operability of the reduction apparatus.

Thus, the present inventor has conducted an earnest study of the reduction apparatus so as to improve the operability of the reduction apparatus in consideration of this human feeling. The outline of the study will be described below.

That is, according to the findings of the inventor, a living thing amplifies an input from a sensory organ non-linearly, that is, in a non-linearly proportional manner. Hence, the inventor has conducted a study and has come to find that the spiral marrow and brain of a living thing, in particular, of a man has a characteristic that sensitivity is amplified in a low range and is reduced in a high range.

Further, the inventor has conducted an experiment and a study based on the experiment and has come to find that also when a man applies force to an object, a different sensitivity characteristic is produced in human sensitivity relating to the action of force between when the force is gradually increased and when the force is gradually decreased. In other words, when the man applies force to the object, the effect of friction cannot be neglected, so a sensitivity characteristic curve becomes asymmetric in acceleration and deceleration realized by the man. The inventor has thought that this asymmetric property is equivalent to that "acceleration can be adjusted in the range of small force but deceleration needs to be adjusted in the range of large force". In order to respond this property, the inventor has come to hit on an idea that the characteristic curve of acceleration and the characteristic curve of deceleration needs to be asymmetric.

Further, the inventor has conducted various studies on the basis of the findings obtained in the manner described above and has come to hit on an idea that it is necessary to employ power assist control based on a computation algorithm or a function for amplifying force applied by the operator in a small force input range at the time of acceleration and for amplifying force applied by the operator in a large force input range at the time of deceleration.

The inventor has found that when an assist target force is gradually increased, a function in which sensitivity is amplified in a lower range and is reduced in a higher range is preferably employed as a specified computation algorithm. As a function for performing this control is preferably used a logarithmic function (fup(X)=ln(X), fup(X)=$\log_a(X)$) or a (1/n)-th order function (where n is a natural number not less than 2). On the other hand, the inventor has found that when an assist target force is gradually decreased, a function in which sensitivity is amplified at an initial stage and then is gradually reduced is preferably used. As a function for performing this control is preferably used an exponential function (fdown(X)=$e^X$, fdown(X)=$a^X$) or an n-th order function (where n is a natural number not less than 2).

In other words, in the case where the assist target force X applied to the patient's foot of an object by the man is increased, when the force is small, an increase rate of a force Y (or speed) driven by the power assist control is increased on the basis of a "predetermined function fup(X)", and when the force is large, the increase rate of the force Y (or speed) driven by the power assist control is decreased on the basis of a "predetermined function fup(X)". The predetermined function fup(X) satisfying such condition, as shown by the solid-line curved graph in the first quadrant of the graph shown in FIG. 8, is "a function which is an increasing function and whose derivative fup'(X) differentiated by the assist target force X is a decreasing function", more preferably, "a function which is a monotone increasing function and whose derivative fup'(X) differentiated by the assist target force X is a monotone decreasing function". Here, in FIG. 8, the function fup(X) passes through the origin but does not necessarily passes through the origin when there is provided an offset.

Similarly, in the case where the assist target force X applied to the patient's foot of the object by the man is decreased, when the force is small, an increase rate of the force Y (or speed) driven by the power assist control is decreased on the basis of a "predetermined function fdown(X)", and when the force is large, the increase rate of the force Y (or speed) driven by the power assist control is increased on the basis of the "predetermined function fdown(X)". The predetermined function fdown(X) satisfying such condition, as shown by the dotted-line curved graph in the first quadrant of the graph shown in FIG. 8, is "a function which is an increasing function and whose derivative fup'(X) differentiated by the assist target force X is an increasing function", more preferably, "a function which is a monotone increasing function and whose derivative fup'(X) differentiated by the assist target force X is a monotone increasing function". Here, in FIG. 8, the function fup(X) passes through the origin but does not necessarily passes through the origin when there is provided an offset.

Moreover, when the power assist control is performed on the basis of the function in the first quadrant of the graph shown in FIG. 8, a case where a state where the force is increased is changed to a state where the force is decreased or a case where a state where the force is decreased is changed to a state where the force is increased occurs frequently. In this case, the function fup(X) when the assist target force X is increased and the function fdown(X) when the assist target force X is decreased are continuously switched in response to an increase or a decrease in the assist target force X. Specifically, control at the time of acceleration and control at the time of deceleration are continuously switched in the following manner.

That is, when the operator applies force to the object, the output of the power assist control is increased along the function (fup(X)) shown by the slid-line graph shown in FIG. 8 as the assist target force X is increased. For example, when the assist force is changed in a direction to reduce at a point (1=fup(1)) where the assist target force X is 1N and where the output of the power assist control become 1N, the function (fdown(X)), which is shown by a graph shown by a dotted line and which passes through the point where the assist target force is 1N and where the output of the power assist control is 1N, is determined by the information processing part as the control means. As the assist target force X is decreased, the output of the power assist control is decreased along the function shown by the dotted-line graph. In this regard, also when a state where the assist target force is decreased is changed to a state where the assist target force is increased, the same control is performed between the function fdown(X) of the state where the assist target force is decreased and the function fup(X) of the state where the assist target force is increased.

Further, the present inventor has conducted various experiments relating to the action of force applied by the human hand and has obtained findings. According to the findings obtained from the experiments, the inventor has come to find that when a man applies force to an object by his hand, a different sensitivity characteristic is produced in sensitivity with which the man applies the force to the object between when the force is applied to the object in a direction to bring the object close to the man, or when the object is "pulled", and when the force is applied to the object in a direction to separate the object from the man, or when the object is "pushed".

Thus, the function fup(X) when the assist target force X is increased and the function fdown (X) when the assist target force X is decreased are constructed so as to be set independently from each other according to the direction of the assist target force X. Here, for the sake of convenience, in the graph shown in FIG. 8 is shown a case where the direction of the assist target force X is changed to be negative (graph shown in the third quadrant). The graph shown in the first quadrant and the graph shown in the third quadrant can be set independently from each other. In other words, when the object is "pulled" by the hand of the operator and when the object is "pushed" by the hand of the operator, different functions are set independently from each other.

Further, in FIG. 8, positive and negative are set so as to match the direction of the force, but the graph in the third quadrant is substantially the same control as the graph in the first quadrant. In other words, "that f(X) is an increasing function and f'(X) is a decreasing function in the case where the assist target force X is positive (for example, in a direction to pull the object)" is the physically same control as "that f(X) is an increasing function and f'(X) is an increasing function (graph shown by the solid curved graph) in the case where the direction of the force is reversed to make the assist target force X negative (for example, in a direction to push the object)". Similarly, "that f(X) is an increasing function and f'(X) is an increasing function (graph shown by dotted curved graph) in the case where the assist target force X is positive (for example, in a direction to pull the object)" is the physically same control as "that f(X) is an increasing function and f'(X) is a decreasing function in the case where the direction of the force is reversed to make the assist target force X negative (for example, in a direction to push the object)". Paying attention to the magnitude of the assist target force X, the feature of the function in the case where the assist target force X is positive becomes a physical control function.

The above-mentioned control is performed by a section for extracting force applied by operator and for processing non-linearization computation, the section being shown in FIG. 6 and FIG. 7. That is, as shown in FIG. 6, in this second embodiment, signal noises are removed from the data of the assist target force X by a low-pass filter 401 (LPF 401), the data being inputted from the force sensor 114. The force data having signal noises removed is supplied to a self-weight cancel processing part 501. In the self-weight cancel processing part 501, an imaginary force in a direction to cancel the gravity applied to the object is set, whereby the effect of the gravity is canceled. Since the effect of the gravity is canceled, the assist target force applied to the object is extracted as data.

The data of this assist target force is supplied to an acceleration curve non-linearization computation processing part 502 and a deceleration curve non-linearization computation processing part 503. When the assist target force or the speed is increased, the processing of the assist target force is performed in the acceleration curve non-linearization computation processing part 502. On the other hand, when the assist target force or the speed is decreased, the processing of the assist target force is performed in the deceleration curve non-linearization computation processing part 503.

Examples of a function used in the acceleration curve non-linearization computation processing part 502 are a logarithmic function and a (1/n)-th order function. Moreover, examples of a function used in the deceleration curve non-linearization computation processing part 503 are an exponential function and an n-th order function.

Specifically, as one example of the function used in the acceleration curve non-linearization computation processing part 502 is used the following function shown by Formula 5,

[Formula 5]
$$f(X) = A \cdot (B \cdot X + C)^{\frac{1}{n}} + D = A \cdot \sqrt[n]{B \cdot X + C} + D \quad (1)$$

where A, B are constants, C is a target force offset (input), D is an assist force offset (output), and n is a natural number not less than 2. Here, the solid-line curved graph in FIG. 8 shows a function of the Formula (1) in which n=2 and which passes through the origin, that is, a graph of the following function.

[Formula 6]
$$f(X) = A \cdot (B \cdot X)^{\frac{1}{2}} = A \cdot \sqrt{B \cdot X} \quad (2)$$

Moreover, according to the findings of the inventor, the Formula (2) is preferable in the reduction apparatus. Various functions other than the (1/n)-th order function and the logarithmic function can be utilized for usage other than the reduction apparatus. For example, part of a trigonometric function (a part which increases monotonously and the derivative of which decreases monotonously) can be also utilized.

Similarly, one example of a function used in the deceleration curve non-linearization computation processing part 503 is the following function shown by a Formula 7,

[Formula 7]
$$f(X) = A \cdot (B \cdot X + C)^n + D \quad (3)$$

where A, B are constants, C is a target force offset (input), D is an assist force offset (output), and n is a natural number not less than 2.

Thereafter, the data of the assist target force processed by the acceleration curve non-linearization computation processing part 502 or the deceleration curve non-linearization computation processing part 503 is supplied to a rotation computation processing part 504 where rotation computation of the object relating to the force sensor 114 is performed.

(PID Control)

Moreover, as shown in FIG. 6, in the PID control in the speed range and in the acceleration range according to this second embodiment, there is provided a dead time element processing part 505 and a rotation computation processing part 506, which is different from the first embodiment. A dead time is computed by the dead time element processing part 505 and then is subjected to a constant multiplication processing 507. Further, a difference is found from the result of this computation and the output from a differentiation processing part 415 and is inputted to an integration processing part 417. Thereafter, the result of integration is subjected to a constant multiplication processing by the constant multiplication processing part 414. Here, other portions of the PID control are the same as in the first embodiment and hence its description will not be described.

Moreover, as shown in FIG. 7, in the PID control in the speed range, there is not provided the integration processing part 417 and the differentiation processing part 415, which is different from the above-mentioned the PID control in the speed range and in the acceleration range. That is, the output from the dead time element processing part 505 is multiplied by a constant by the constant multiplication processing part 507. Then, a difference is found from the result of this computation and the output from the differentiation processing part 416 and is supplied to the constant multiplication processing part 414 where the difference is subjected to the constant multiplication processing. Here, other portions of the PID control are the same as in the first embodiment and hence its description will not be described.

First, the dead time element processing part 505 shown in FIG. 6 and FIG. 7 will be described. That is, since the man applies force in the power assist control, there is developed a phenomenon that the assist target force is increased or decreased within a small range. At this time, if the acceleration curve non-linearization computation processing and the deceleration curve non-linearization computation processing are switched in strict response to an increase and a decrease in the assist target force, the motion of the object may be fluctuated. Thus, in the PID control according to the second embodiment, the dead time element processing part 505 eliminates a change in the assist target force within a small time, that is, sets so-called "play" to prevent the object from being fluctuated.

Next, the rotation computation processing part 506 will be described. That is, in the second embodiment, the function of computing rotation which is performed by the encoder 423 in the related art is performed by the PID control in the control means. For this reason, in the reduction apparatus, the rotation computation processing can be performed by software. With this, various encoders and motors can be used as the encoder 423 and the motor 421.

While the embodiments of this invention have been described above, this invention is not limited to the above-mentioned embodiments but can be variously modified on the basis of the technical idea of this invention. For example, the numerical values and Formulae described above are only examples and other numerical values and Formulae different from these may be used as needed.

Moreover, for example, if the swing arm 52 can be extended and contracted, whatever physical size the patient K has, that is, even if the patient K is small or large in size or an adult or a child, it is possible to make the swing arm 52 respond to the patient K by extending or contracting the swing arm 52. For example, by providing arm extending/contracting means for extending and contracting the swing arm 52, the swing arm 52 can be automatically extended and contracted to reduce the human power to a minimum necessary amount. Moreover, for example, the swing arm 52 moves the lower limb K1 to the left and right and the first moving table 61 twists the lower limb K1 and the second moving table 67 extends and contracts the lower limb K1 and the third moving table 64 moves up and down the lower limb K1. This construction is suitable for the doctor or the like to perform the reduction treatment freely.

Further, for example, the swing arm 52, the first moving table 61, the second moving table 67, the third moving table 64, and the lower leg support base 58 can be mounted stepwise in a specified order, for example, in the order described in this first embodiment. In this case, the construction can be simplified as compared with a case where the respective parts are assembled independently and separately.

Still further, for example, the lower leg support base 58 is provided with securing means (for example, the band 111) for securing the lower leg K2 of the patient K, so the force can be effectively transferred to the leg of the patient K from the lower leg support base 58. Moreover, the respective motions of moving the lower limb K1 and the ankle K4 can be performed independently and two or more motions of them can be performed at the same time. For example, by driving the swing arm 52 and the coupling members 72A, 72B at the same time, the lower limb K1 can be moved to the left and right and the ankle K4 can be bent back and forth at the same time.

Still further, the lower leg support base 58 is provided with the sole backing member 110 on which the sole of the patient K is placed, so that the force can be applied to the whole of the sole of the patient K when the lower limb K1 is extended and contracted back and forth or when the angle K4 is bent back and forth or twisted to the left and right. This can prevent giving the patient K unnecessary pain.

Still further, while an example in which drive means (arm drive means) for swinging the swing arm 52 of the reduction unit 5 is provided has been described in the first embodiment, this drive means is not necessarily required. When the drive means is not provided, the swing arm 52 is swung to a desired position and is positioned by the human power.

This invention can be applied not only to the reduction apparatus but also to various kinds of apparatuses such as construction machines and transport machines used for construction works, the apparatus being constructed so as to assist force to be applied to an object by detecting an external force applied to the object.

Still further, in the above first embodiment, as shown in FIG. 3, a device having switches projected outside is used as the operation box 117. However, the operation box 117 can employ also a construction in which various switches shown in FIG. 3 are displayed on a touch panel and can perform the same operations as the buttons. Even in this construction, it is preferable that an emergency stop button for stopping the operation of the reduction apparatus at the time of emergency is constructed of a button projected outside from the touch panel.

DESCRIPTION OF REFERENCE NUMERALS 5 reduction unit
50 support base
52 swing arm
52A bolt
56 support plate
56B stopper
58 lower leg support base
60 axis
61, 67, 74 moving table
62, 83, 97, 102, 104, 120, 421, 605 motor
64 moving table
65 third drive means
67 moving table
68 second drive means
72 universal coupling
72A, 72B coupling member
73 relay plate
75 guide member
76 intermediate member
77 lifting and lowering member
102, 104 hollow motor
110 sole backing member
110A seat portion
111 band
113 control unit
114, 601 force sensor
115 force display part
117 operation box
118 driver
121 foot switch
401 low-pass filter
402 non-linearization computation processing part
403 patient's foot gravity direction vector production processing part
404 end effect gravity direction vector production processing part
411, 417 integral control part
412 proportional control part
413 derivative control part
414, 507 constant multiplication processing
422 integration processing part
423, 606 encoder
425, 416 differentiation processing part
501 self-weight cancel processing part
502 acceleration curve non-linearization computation processing part
503 deceleration curve non-linearization computation processing part
504, 506 rotation computation processing part
505 dead time element processing part
602 computation processing
604 integration processing

The invention claimed is:

1. A power assist control method for controlling a power assist apparatus by a controller in such a way that a driver for applying force to an object outputs an assist force F or a speed F based on an assist target force X applied from outside and measured by force a detector for measuring force applied to the object, the power assist control method comprising:

the controller commanding the driver to output the assist force F or the speed F by power assist control on the basis of a function f(X) having the assist target force X as a variable, wherein the function f(X) is a function which is an increasing function and whose derivative f'(X) is a decreasing function, and wherein the function f(X) is expressed by a formula 8

(Formula 8)

$$f(X) = A \cdot (B \cdot X + C)^{\frac{1}{n}} + D$$

where A and B are positive constants, C and D are constants, and n is a natural number not less than 2.

2. A power assist control method for controlling a power assist apparatus by a controller in such a way that a driver for applying force to an object outputs an assist force F or a speed F based on an assist target force X applied from outside and measured by a force detector for measuring force applied to the object, the power assist control method comprising:

the controller commanding the driver to output the assist force F or the speed F by the power assist control on the basis of a function f(X) having the assist target force X as a variable, a function fup(X) when the assist target force X is increased being different from a function fdown(X) when the assist target force X is decreased, and wherein the function fup(X) is an increasing function; a derivative fup'(X) of the function fup(X) is a decreasing function; the function fdown(X) is an increasing function; and a derivative fdown'(X) of the function fdown (X) is an increasing function.

3. A power assist control method as claimed in claim 2, wherein the function fup(X) when the assist target force X is increased and the function fdown(X) when the assist target force X is decreased can be set independently of each other according to a direction of the assist target force X.

4. A power assist control method as claimed in claim 2, wherein the function fup(X) when the assist target force X is increased and the function fdown(X) when the assist target force X is decreased can be continuously switched in response to an increase and a decrease in the assist target force X.

5. A power assist control method as claimed in claim 2, wherein the function fup(X) when the assist target force X is increased is expressed by a Formula 9

(Formula 9)

$$f_{up}(X) = A \cdot (B \cdot X + C)^{\frac{1}{n}} + D$$

where A and B are positive constants, C and D are constants, and n is a natural number not less than 2.

6. A power assist control method as claimed in claim 1, wherein the force detector is a six axial force sensor capable of detecting force applied in three translational axial directions and in three rotational axial directions, and in that the power assist control is performed along each axial direction of the six axial directions.

7. A power assist control method as claimed in claim 1, wherein feedback control by proportional-integral-derivative control in a speed range and/or in an acceleration range of the object is performed on the basis of a change in a speed and/or a change in an acceleration of the object.

8. A power assist control apparatus comprising:

a force detector constructed so as to be able to measure force applied to an object;

a driver for applying force to the object; and a controller constructed so as to be able to control the driver and to communicate data with the force detector, wherein the controller commands the driver to output an assist force F or a speed F by power assist control on the basis of a function f(X) having an assist target force X measured by the force detector as a variable, the function f(X) being a function which is an increasing function and whose derivative f'(X) is a decreasing function, and wherein the function f(X) is expressed by a formula 8

(Formula 8)

$$f(X) = A \cdot (B \cdot X + C)^{\frac{1}{n}} + D$$

where A and B are positive constants, C and D are constants, and n is a natural number not less than 2.

9. A power assist control apparatus comprising:

a force detector constructed so as to be able to measure force to be applied to an object;

a driver for applying force to the object; and a controller constructed so as to be able to control the driver and to communicate data with the force detector, wherein the controller commands the driver to output an assist force F or a speed F by power assist control on the basis of a function f(X) having an assist target force X measured by the force detector as a variable, a function fup(X) when the assist target force X is increased being different from a function fdown(X) when the assist target force X is decreased, and wherein the function fup(X) is an increasing function; a derivative fup'(X) of the function fup(X) is a decreasing function; the function fdown(X) is an increasing function; and a derivative fdown'(X) of the function fdown (X) is an increasing function.

10. A power assist control apparatus as claimed in claim 9, wherein the function fup(X) when the assist target force X is increased and the function fdown(X) when the assist target force X is decreased can be set independently of each other according to a direction of the assist target force X.

11. A power assist control apparatus as claimed in claim 9, wherein the function fup(X) when the assist target force X is increased and the function fdown(X) when the assist target force X is decreased can be continuously switched.

12. A power assist control apparatus as claimed in claim 9, wherein the function fup(X) when the assist target force X is increased is expressed by a Formula 11

(Formula 11)

$$f_{up}(X) = A \cdot (B \cdot X + C)^{\frac{1}{n}} + D$$

where A and B are positive constants, C and D are constants, and n is a natural number not less than 2.

13. A power assist control apparatus as claimed in claim 8, wherein the force detector is a six axial force sensor capable of detecting force applied in three translational axial directions and in three rotational axial directions, and in that the power assist control can be performed along each axial direction of the six axial directions.

14. A power assist control apparatus as claimed in an claim 8, wherein feedback control by proportional-integral-differential control in a speed range and/or in an acceleration range of the object is performed on the basis of a change in a speed and/or an acceleration of the object.

15. A reduction apparatus comprising:

a force detector constructed so as to be able to measure force to be applied to an object;

a driver for applying force to the object; and a controller constructed so as to be able to control the driver and to communicate data with force detector, wherein the controller has a power assist control mechanism constructed in such a way that the driver can move the object at a speed F or can apply an assist force F to the object on the basis of a function f(X) having an assist target force X detected by the force detector as a variable, the function f(X) being a function which is an increasing function and whose derivative f'(X) is a decreasing function, and wherein the function f(X) is expressed by a formula 8

(Formula 8)

$$f(X) = A \cdot (B \cdot X + C)^{\frac{1}{n}} + D$$

where A and B are positive constants, C and D are constants, and n is a natural number not less than 2.

16. A reduction apparatus comprising:
a force detector constructed so as to be able to measure force applied to an object;
a driver for applying force to the object; and
a controller constructed so as to be able to control the driver and to communicate data with force detector,
wherein the controller has a power assist control mechanism in which the driver is constructed so as to output an assist force F or a speed F by power assist control on the basis of a function f(X) having an assist target force X measured by the force detector as a variable, a function fup(X) when the assist target force X is increased being different from a function fdown(X) when the assist target force X is decreased, and
wherein the function fup(X) is an increasing function; a derivative fup'(X) of the function fup(X) is a decreasing function; the function fdown(X) is an increasing function; and a derivative fdown'(X) of the function fdown(X) is an increasing function.

17. A reduction apparatus as claimed in claim 16, wherein the function fup(X) when the assist target force X is increased and the function fdown(X) when the assist target force X is decreased can be set independently of each other according to a direction of the assist target force X.

18. A reduction apparatus as claimed in claim 16, wherein the function fup(X) when the assist target force X is increased is expressed by a Formula 13

(Formula 13)

$$f_{up}(X) = A \cdot (B \cdot X + C)^{\frac{1}{n}} + D$$

where A and B are positive constants, C and D are constants, and n is a natural number not less than 2.

19. A reduction apparatus as claimed in claim 15, wherein the force detector is a six axial force sensor capable of detecting force applied in three translational axial directions and in three rotational axial directions, and in that the power assist control is performed along each axial direction of the six axial directions.

20. A reduction apparatus as claimed in claim 15, wherein feedback control by proportional-integral-derivative control in a speed range and/or in an acceleration range of the object is performed on the basis of a change in a speed and/or an acceleration of the object.

* * * * *